United States Patent
Ouellette et al.

(10) Patent No.: US 6,823,273 B2
(45) Date of Patent: Nov. 23, 2004

(54) METHODS AND APPARATUS FOR SECURE PROGRAMMING OF AN ELECTRICITY METER

(75) Inventors: Maurice J. Ouellette, North Berwick, ME (US); Gregory P. Lavoie, Bristol, CT (US); Robert E. Lee, Jr., Dover, NH (US); Virginia H. Zinkowski, E. Kingston, NH (US); Larry A. Schmidt, Rochester, NH (US); Kenneth P. Lizotte, Nottingham, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,144

(22) Filed: Jul. 26, 2001

(65) Prior Publication Data

US 2002/0013670 A1 Jan. 31, 2002

Related U.S. Application Data

(60) Provisional application No. 60/221,634, filed on Jul. 28, 2000.

(51) Int. Cl.[7] ........................ G06F 12/14; G01R 21/133
(52) U.S. Cl. ........................................ 702/61; 324/110
(58) Field of Search .................. 702/61, 127; 705/412; 324/110, 142

(56) References Cited

U.S. PATENT DOCUMENTS

| | | | | |
|---|---|---|---|---|
| 4,642,564 A | * | 2/1987 | Hurley | 324/132 |
| 5,079,715 A | * | 1/1992 | Venkataraman et al. | 364/481 |
| 5,317,546 A | * | 5/1994 | Balch et al. | 368/9 |
| 5,495,167 A | * | 2/1996 | Cotroneo | 324/74 |
| 5,742,512 A | | 4/1998 | Edge et al. | |
| 5,924,051 A | * | 7/1999 | Provost et al. | 702/61 |
| 6,000,034 A | * | 12/1999 | Lightbody et al. | 713/202 |
| 6,081,204 A | * | 6/2000 | Lavoie et al. | 340/870.02 |
| 6,100,880 A | * | 8/2000 | Thurig et al. | 345/211 |
| 6,219,656 B1 | * | 4/2001 | Cain et al. | 705/412 |
| 6,256,128 B1 | | 7/2001 | Lavoie et al. | |
| 6,429,785 B1 | * | 8/2002 | Griffin et al. | 340/870.02 |
| 6,532,128 B1 | * | 3/2003 | Bui et al. | 360/74.1 |

\* cited by examiner

*Primary Examiner*—Marc S. Hoff
*Assistant Examiner*—Paul L Kim
(74) *Attorney, Agent, or Firm*—Armstrong Teasdale LLP

(57) ABSTRACT

An apparatus and method for creating a secure program history log for a programmable device including a microprocessor, at least one communications port for communicating with the microprocessor and at least one memory device electrically connected to the microprocessor. The memory device includes a program history log, and the method includes communicating program parameters to the microprocessor, creating a log entry utilizing the microprocessor and the program parameters, and writing the log entry into the program history log utilizing the microprocessor.

22 Claims, 3 Drawing Sheets

METHODS AND APPARATUS FOR SECURE PROGRAMMING OF AN ELECTRICITY METER

CROSS REFERENCE TO RELATED APPLICATIONS

This application claims the benefit of U.S. Provisional Application No. 60/221,634 filed Jul. 28, 2000.

BACKGROUND OF INVENTION

This invention relates generally to electronic electricity meters, and more particularly to methods and apparatus for preserving the security of programmable electronic electricity meters.

Modern digital electronic electricity meters require a high level of security of operation to prevent theft of service by meter tampering, including the possibility of tampering with the meter data or with the many programmable parameters in the meter which control meter operation and can significantly effect the billing quantities calculated by the meter. It has been a practice in some areas to control the changing of programmed meter parameters by preventing or severely constraining these changes. In practice this process is very onerous, as there are valid reasons to revise these parameters from time to time.

In at least one known type of electronic electricity meter, unauthorized program changes have been prevented by use of a feature known as a seal flag. Once a meter has been programmed by an authorized agent the seal flag feature is set, preventing further changes to controlled parameters. The meter design incorporates the selection of which tables are sealed and which are not. Although these meters provide security from unauthorized program changes, they lack programming flexibility in those cases in which there is a legitimate need to modify metering parameters.

In at least one known type of electronic electricity meter, a record of the date last programmed and a programmer ID is kept. It is also known to use tables to log event histories in meters. These meters provide the flexibility needed to modify metering parameters. However, there exists the possibility of unauthorized parties tampering with the log files themselves.

SUMMARY OF INVENTION

In one aspect, a method for creating a secure program history log for a programmable device including a microprocessor, at least one communications port for communicating with the microprocessor and at least one memory device electrically connected to the microprocessor and including a program history log is provided. The method comprises communicating program parameters to the microprocessor, creating a log entry utilizing the microprocessor and the program parameters, and writing the log entry into the program history log utilizing the microprocessor.

In another aspect, a system for creating a secure program history log for a programmable device is provided. The system comprises at least one communications port, said communications port configured to receive inputs comprising program parameters, a microprocessor configured to receive said program parameters from said communications port and create a log entry based on said program parameters, and at least one memory device electrically connected to said microprocessor and comprising said program history log, said microprocessor further configured to write said log entry into said program history log, thereby protecting said program history log from manipulation via direct communication from said communications port.

In still another aspect, an electronic electricity meter is provided that comprises a communications port, said communications port configured to receive meter input parameters, a microprocessor configured to receive said meter input parameters from said communications port and determine energy consumption based upon said meter input parameters, said microprocessor further configured to create a program history log entry when meter parameters are received, and at least one memory device electrically connected to said microprocessor and comprising a program history log, said microprocessor further configured to write said log entry into said program history log.

In yet another aspect, an electronic electricity meter comprising a microprocessor, at least one memory device and a communications port is provided. The microprocessor is configured to determine energy consumption based upon at least one meter input parameter. The at least one memory device is electrically connected to said microprocessor and comprises a program history log. The communications port is configured to receive said at least one meter input parameter for use by said microprocessor. The microprocessor is configured to create a program history log entry and configured to write said log entry into said program history log when said at least one meter parameter is received, said program history log comprising at least one of an entry sequence number, a transaction number, a date and time stamp, and a table identifier.

DETAILED DESCRIPTION

Figure 1:
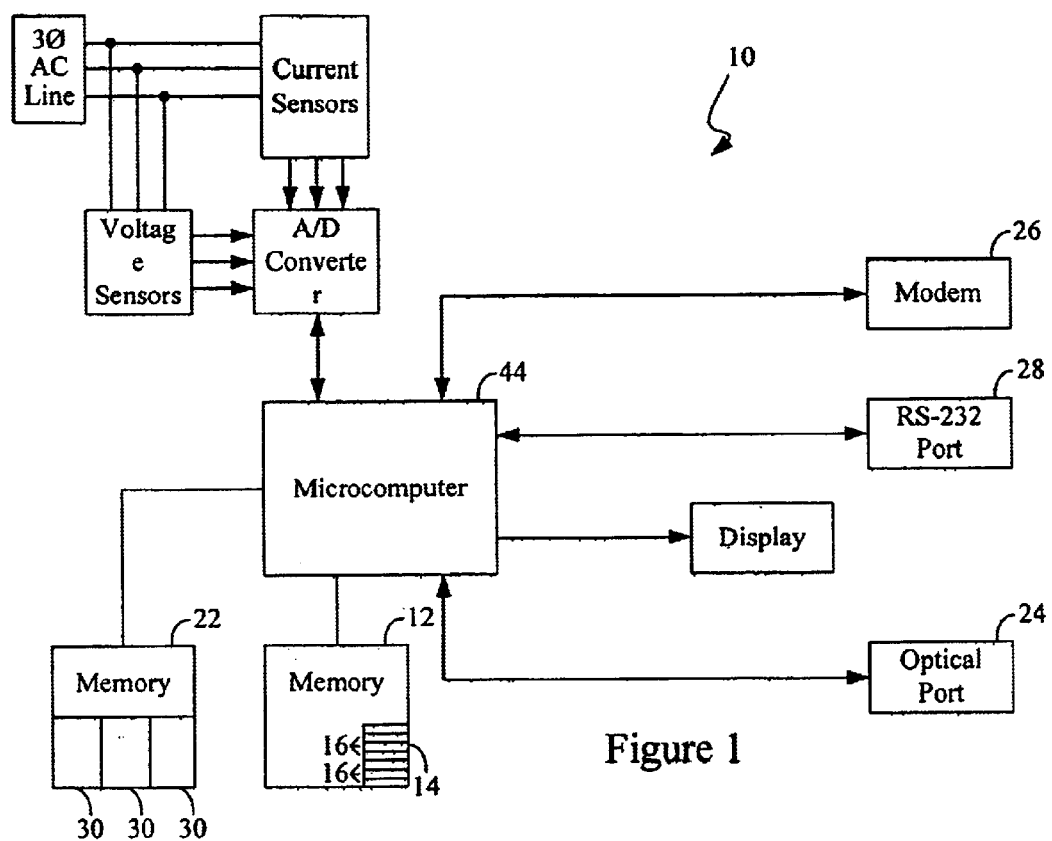
FIG. 1 is a block diagram of one embodiment of an electronic electricity meter of the present invention.
Figure 2:
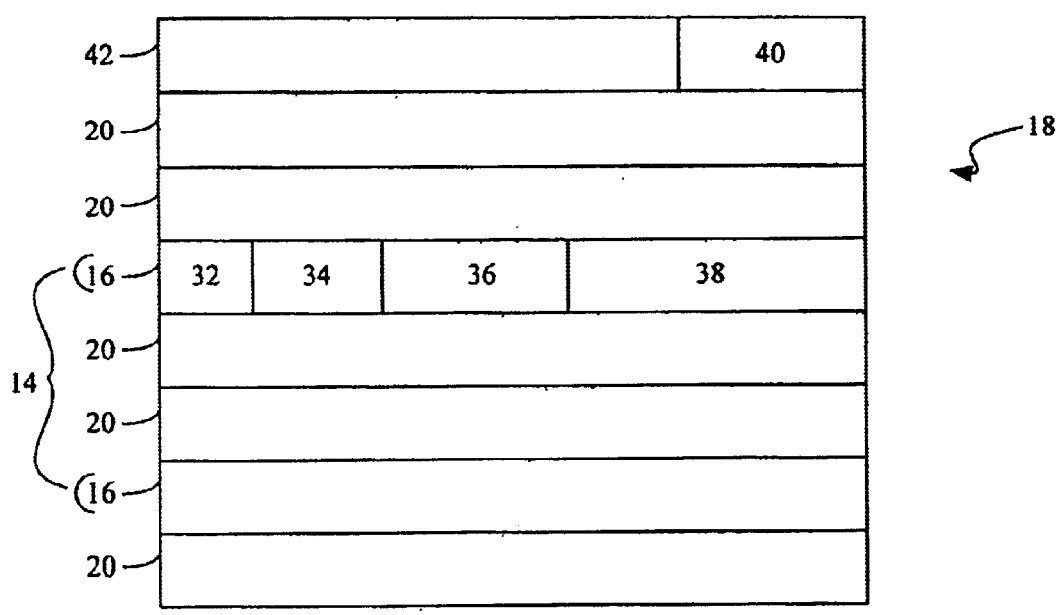
FIG. 2 is a representation of a program history log for the electronic electricity meter shown in FIG. 1 comprising identifiable types of records within a more general table.

In one embodiment of the present invention, and referring to FIGS. 1 and 2, a programmable electronic electricity meter 10 is provided with a memory 12 for maintaining a program history log 14. Meter 10, in accordance with known meters, includes voltage sensors and current sensors coupled to a power supply of a metered electrical system, such as a residence, business, or other establishment wherein power consumption is monitored by meter 10. In one embodiment, the voltage and current sensors are coupled to an analog-to-digital (A/D) converter that converts signals from the voltage and current sensors to digital output signals to meter electronics.

Meter electronics accumulate data and determine energy consumption and quantities of interest according to known methods and techniques. Data outputs are determined according to programmed parameters input to the electronics. In an effort to monitor accuracy of meter parameters, program history log 14 is included to determine a state of meter parameters, changes to those parameters, and information relating to changed or altered meter parameters. Unauthorized changes may therefore be detected and redressed to thwart unauthorized meter programming and tampering that illegitimately affects billed quantities for energy consumption.

In one embodiment, program history log 14 comprises entries or records 16 of an identifiable type. In another embodiment, program history log comprises a more general event or security program history log 18 (shown in FIG. 2), which includes records 16 of an identifiable type and other general event records 20. In yet another embodiment, program history log 14 is contained in a separate memory element 22 within meter 10. In each of these embodiments, parameters of meter 10, including but not limited to, for example, selections of quantities for load profiles, real-time pricing schedules, and time of use metering mode parameters are programmed into meter 10. Programming of meter parameters is performed, for example, via an optical communications port 24, a telephone modem 26, an RS-232 port 28, or another communication port (not shown) of meter 10 according to known methods and techniques. The various programmable parameters are stored in tables 30 in system memory, such as memory 22. As contemplated herein, a single programmable parameter stored in memory that is not part of a larger table 30 may be considered as being stored in a table 30 having a single parameter.

Each programming session with meter 10 creates or generates a log entry 16 in program history log 14. Thus, remote programming sessions of meter 10 taking place via modem 26 create a log entry 16, as do programming sessions that take place via optical port 24 of meter 10 or via other input ports of meter 10. Each log entry 16 includes information relating to programming of meter 10 so that changes to meter parameters may be identified, and, if necessary, such as for unauthorized changes or tampering with meter 10, meter parameters may be restored and further, log entry 16 may provide information that may reveal the perpetrator of programming changes.

For example, in an illustrative embodiment, each log entry 16 includes an entry sequence number 32, a date and time stamp 34, a transaction number 36 for the programming event, and an entry 38 identifying each table 30 written for the logged event. A meter identifier 40 is also stored in conjunction with the history log 14, in a designated location, such as, for example, a header section 42 of table memory or as part of each entry 16. Each log entry 16 is written into program history log 14 by a meter processor 44, which as noted above accumulates metered data quantities, makes calculations and otherwise manipulates data inputs into usable output form.

In one embodiment, memory 12 (or memory 22 in another embodiment) into which a log entry 16 is stored is configured to be accessible internally by processor 44 of electricity meter 10 to the exclusion of external inputs. As such, data entry into meter 10 via communication ports 24, 26, 28 cannot be directly written into history log 14 via communication from devices external to meter 10. Consequently, meter parameter data may not be easily altered with conventional techniques, including but not limited to specific memory addressing. Thus, program history log 14 may generally not be cleared or erased, and log entries 16 may not be changed or altered once log 16 is written into program history log 14 by processor 44. It is contemplated, however, that in a further embodiment, a "master reset" function is provided that can be accessed for disaster recovery of meter 10 that would wholly or partially reset data values of program history log 14.

As noted above, log entries 16 are written or added to program history log 14 as programming events occur. In one embodiment, when program history log 14 is full, i.e., when all available designated memory locations are written to, log entries 16 wrap around as though program history log 16 were a circular buffer, so that an oldest entry is overwritten by a newest entry. Thus, for the embodiment illustrated in FIG. 1, program history log 14 of memory 12 contains seven memory locations for storing seven log entries relating to seven respective programming events. Upon the occurrence of the eighth programming event, one of the seven memory locations (and in a particular embodiment the memory location containing a log entry 16 relating to the first or earliest recorded programming event) is written over and replaced by a log entry containing information relating to the eighth programming event. Successive programming events likewise are written to the remaining memory locations and overwrite prior data therein.

In a further embodiment, when program history log 14 is filled with log entries 16 that have not been read externally, no further programming changes are allowed until program history log 14, and more specifically, log entries 16 are read out. In this embodiment, meter 10 maintains a pointer, inaccessible external to, or from outside of, meter 10. The pointer points to the last log entry 16 read out from the meter.

In one embodiment, program history log 14 is read externally through one of communications ports 24, 26, or 28 of meter 10 with known devices according to known techniques. In particular embodiments, either an entire history log 14 is read out from meter 10, or specific entries 16 made since the last read out, as indicated by the pointer referred to above, are read out from meter 10.

Figure 3:
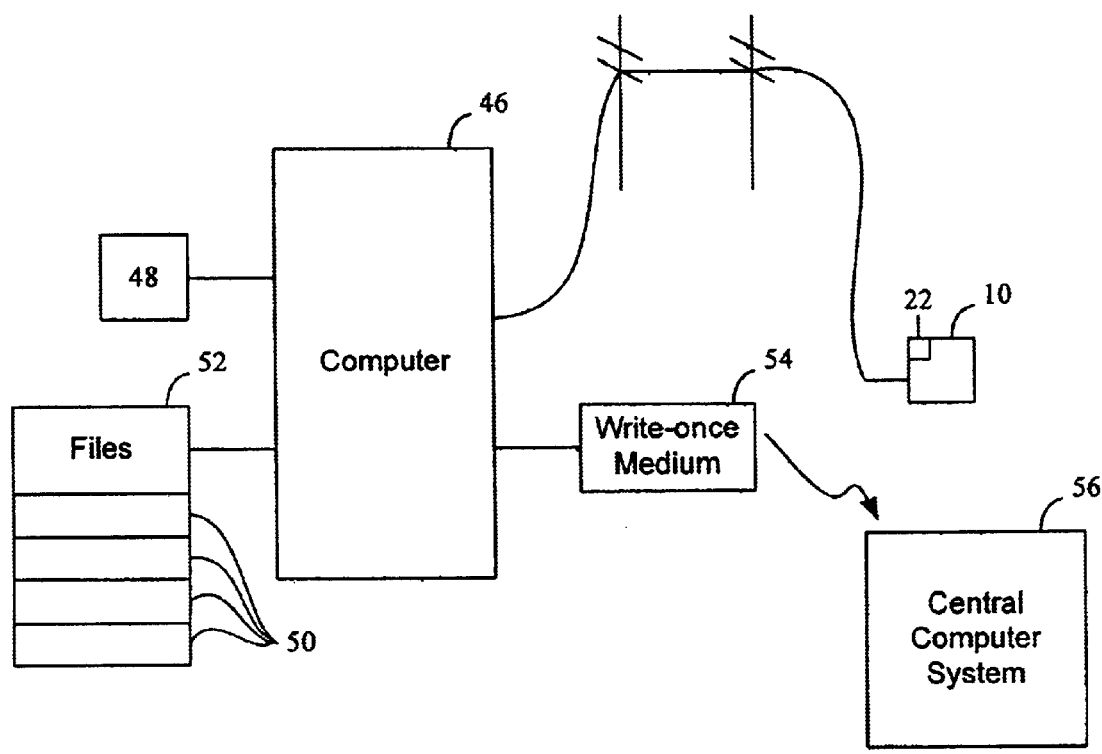
FIG. 3 is a representation of a remote computer system in communication via a telephone modem with the meter shown in FIG. 1.

In an exemplary embodiment, and referring now to FIG. 3, new values of parameters programmed into meter 10 are stored in a computer system 46 outside of, or external to, 10. When a meter programming event occurs, the programming process is controlled by computer 46, which executes programming software 48 for programming meter 10. Programming software 48 creates a record 50 for each programming event of meter 10. Record 50 is then stored in a file 52. Record 50 includes information in meter program history log 14, or more specifically in log entries 16, that are created for the programming event, plus the new values of the parameters programmed in the session. In one embodiment, programming software 48 creates record 50 by reading meter program tables 30 (shown in FIG. 1) after the programming event. In another embodiment, an even more robust record is created by taking a before reading, i.e., a reading of tables 30 before the programming event, and including the "before" readings in record 50. Suitable security measures for program history records 50 are provided at computer 46, such as password security or file security known in the art. In one embodiment, file contents including records 50 are written to a write-once medium 54, such as a non-reprogrammable programmable read only memory, or a non-rewritable CD-ROM.

In one embodiment in which multiple computer devices 46 are used to program various meters 10 in a utility system, program history files of records 50 are returned to a central computer system 56 for consolidation, much like conventional meter readings are now returned.

The use of entry sequence numbers 32 facilitates easy validation and manipulation of entries. Entry transaction numbers 36 are generated inside the meter by a process providing an output that is difficult to predict, such as an encryption algorithm or a hashing algorithm. Entry transaction numbers 36 are keys that provide secure identifiers linking entries 18 in the internal program history log 14 of a meter 10 to the record 48 of parameters programmed by the session in the computer file 50.

It will thus be recognized that the above-described embodiments provide a secure program history log for an electronic electricity meter, a highly secure record of events, and a complete record of programmed values external to the meter. Memory inside the meter is conserved in at least one embodiment by storing a portion of the historical record outside the meter itself, in a related computer system. It will also be recognized that the present invention is not limited to electronic electricity meters, but can also be applied to many other types of programmable devices as well.

While the invention has been described in terms of various specific embodiments, those skilled in the art will recognize that the invention can be practiced with modification within the spirit and scope of the claims.

What is claimed is:

1. A method for creating a secure program history log for a programmable device including a microprocessor, at least one communications port for communicating with the microprocessor and at least one memory device electrically connected to the microprocessor, the memory device including a program history log to monitor an accuracy of input program parameters, said method comprising:

communicating input program parameters to the microprocessor in a programming event;

creating a log entry utilizing the microprocessor and the program parameters as the input program parameters are communicated; and writing the log entry into the program history log utilizing the microprocessor such that changes to meter parameters are identifiable, and if the changes are unauthorized, the meter parameters are restorable.

2. A method in accordance with claim 1 wherein communicating program parameters comprises inputting program parameters utilizing the communications ports.

3. A method in accordance with claim 1 wherein creating the log entry comprises:

generating at least one of an entry sequence number, a date and time stamp, a transaction number, and a table identifier; and including at least one of the entry sequence number, date and time stamp, transaction number and table identifier in the log entry.

4. A method in accordance with claim 1 further comprising preventing alteration of the log entry after it is written.

5. A method in accordance with claim 1 wherein writing the log entry into the program history log comprises:

writing log entries to different locations in the program history log until the program history log is full; and overwriting an oldest log entry with a new log entry once the program history log is full.

6. A method in accordance with claim 1 wherein said step of writing the log entry into the program history log comprises prohibiting alteration of any log entry except when a master reset function is enabled.

7. A method in accordance with claim 1 further comprising reading at least one of the entire program history log and an individual log entry externally through the communications port.

8. A method in accordance with claim 7 wherein said method further comprises maintaining a pointer that points to the last log entry read; and overwriting the log entry indicated by the pointer with a new log entry.

9. A method in accordance with claim 1 wherein the system further includes a first computer external to the programmable device for communicating with the programmable device, the first computer including programming software and a second memory device, said method further comprising:

communicating the program parameters to the first computer;

executing the programming software to program the programmable device based on the program parameters;

creating at least one record utilizing the programming software and the program parameters; and storing the record in the second memory device.

10. A method in accordance with claim 9 further comprising writing the contents of the second memory device to a write-once medium.

11. A method in accordance with claim 1 wherein the programmable device is an electronic electricity meter, said step of communicating input program parameters to the microprocessor comprising the step of communicating meter parameters to the microprocessor for determining energy consumption data outputs.

12. A system for creating a secure program history log for a programmable device comprising:

at least one communications port, said communications port configured to receive inputs comprising program input parameters in a programming event, said program input parameters employed to generate data outputs from the programmable device;

a microprocessor configured to receive said program input parameters from said communications port and create a log entry based on said program input parameters to monitor changed program input parameters such that changes to meter parameters are identifiable, and if the changes are unauthorized, the meter parameters are restorable; and at least one memory device electrically connected to said microprocessor and comprising said program history log, said microprocessor further configured to write said log entry into said program history log, thereby protecting said program history log from manipulation via direct communication from said communications port.

13. A system in accordance with claim 12 wherein said programmable device comprises an electronic electricity meter.

14. A system in accordance with claim 13 wherein said log entry comprises at least one of a transaction number, a date and time stamp, an entry sequence number, and a table identifier.

15. A system in accordance with claim 13 wherein said system is configured to prohibit alteration of any log entry once it is written into the program history log.

16. An electronic electricity meter comprising:

a communications port, said communications port configured to receive meter input parameters in a programming event;

a microprocessor configured to receive said meter input parameters from said communications port and determine energy consumption data outputs based upon said meter input parameters, said microprocessor further configured to create a program history log entry when meter input parameters are received in the programming event; and at least one memory device electrically connected to said microprocessor and comprising a program history log to record changes to meter input parameters, said microprocessor further configured to write said log entry into said program history log such that changes to meter parameters are identifiable, and if the changes are unauthorized, the meter parameters are restorable.

17. An electronic electricity meter in accordance with claim 16, said meter configured to allow reading of said program history log through said communications port and configured to prohibit direct input into said program history log to record changes to meter input from said communications port.

18. An electronic electricity meter in accordance with claim 17, said program history log entry comprising at least one of an entry sequence number, a transaction number, a date and time stamp, and a table identifier.

19. An electronic electricity meter in accordance with claim 16 wherein said at least one memory device comprises a first memory and a second memory, one of said first and second memory comprising meter input parameters and the other of said first and second memory comprising said program history log.

20. An electronic electricity meter comprising:
   a microprocessor configured to determine energy consumption output data based upon at least one meter input parameter received in a programming event;
   at least one memory device electrically connected to said microprocessor and comprising a program history log for recording said programming event; and
   a communications port, said communications port configured to receive said at least one meter input parameter for use by said microprocessor to generate output data; said microprocessor configured to create a program history log entry and configured to write said log entry into said program history log when said at least one meter parameter is received in said programming event, said program history log comprising at least one of an entry sequence number, a transaction number, a date and time stamp, and a table identifier such that changes to meter parameters are identifiable, and if the changes are unauthorized, the meter parameters are restorable.

21. An electronic electricity meter in accordance with claim 20, said meter configured to allow reading of said program history log through said communications port and configured to prohibit direct input into said program history log from said communications port.

22. An electronic electricity meter in accordance with claim 20 wherein said at least one memory device comprises a first memory and a second memory, one of said first and second memory comprising meter input parameters and the other of said first and second memory comprising said program history log.

* * * * *